W. P. BELL.
ANTISKIDDING DEVICE.
APPLICATION FILED SEPT. 23, 1919.

1,355,027.  Patented Oct. 5, 1920.

WITNESS:
Alfred J. Bratton

William P. Bell
INVENTOR.
BY
Victor J. Evans
ATTORNEY.

UNITED STATES PATENT OFFICE.

WILLIAM P. BELL, OF STATE COLLEGE, PENNSYLVANIA.

ANTISKIDDING DEVICE.

1,355,027.  Specification of Letters Patent.  Patented Oct. 5, 1920.

Application filed September 23, 1919. Serial No. 325,707.

*To all whom it may concern:*

Be it known that I, WILLIAM P. BELL, a citizen of the United States, residing at State College, in the county of Center and State of Pennsylvania, have invented new and useful Improvements in Antiskidding Devices, of which the following is a specification.

The invention relates to anti-skidding devices for use on vehicle wheels particularly as to the tired wheels of motor vehicles and has for an object to provide a combined anti-skid chain and anti-skid block construction for use in preventing the skidding of the vehicle over wet and slippery surfaces.

The invention comprehends among other features a device comprising the usual circular chain adapted to be employed to position cross anti-skid chains over the tread surface of a vehicle tire on a vehicle wheel with suitable supplementary anti-skid means disposed to be brought into effective operation at the time the skidding occurs to interrupt said skidding and prevent the vehicle from sliding sidewise over a wet and slippery surface.

In the further disclosure of the invention, reference is to be had to the accompanying drawings constituting a part of this specification, in which similar characters of reference denote corresponding parts in all the views, and in which,—

Figure 1:
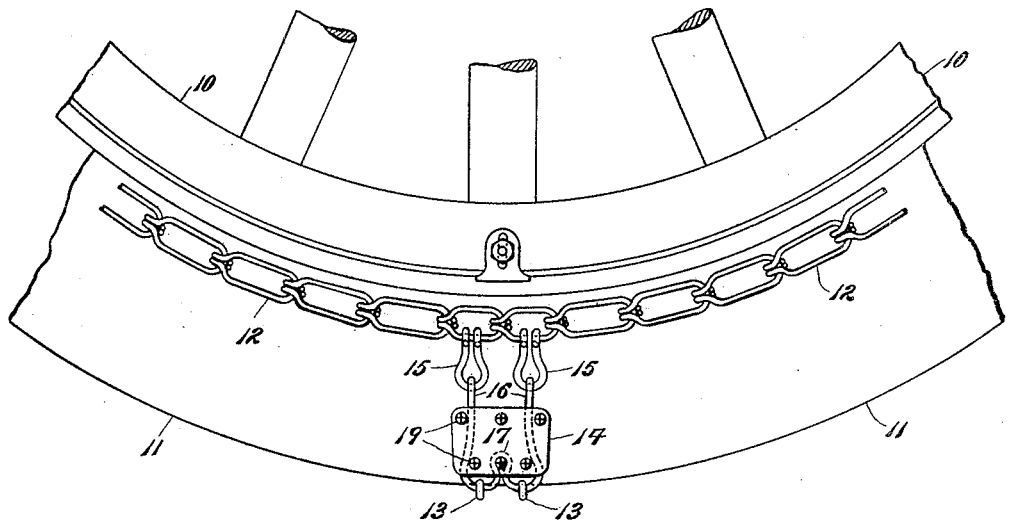

Figure 1— is a fragmentary side elevation of a vehicle wheel showing my device applied thereto.

Figure 2:
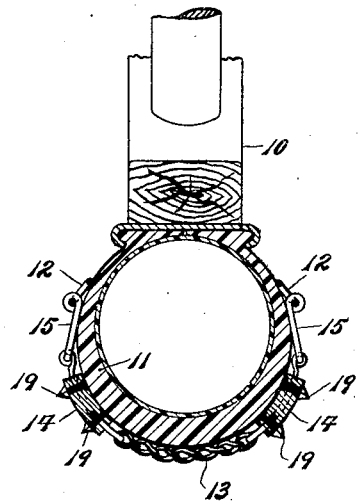

Fig. 2— is a transverse sectional view, and

Figure 3:
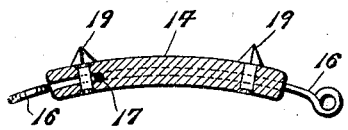

Fig. 3— is a view cut through one of the blocks.

Referring more particularly to the views the numeral 10 indicates a vehicle wheel and the numeral 11, the usual pneumatic tire thereof. The anti-skid device comprises substantially, pairs of side chains 12 supporting the chains 13, and blocks 14. The cross chains are mounted in pairs with two cross chains at periodic intervals around the periphery of the tire and traversing the same with the ends of the chains secured by suitable hooks 15 to the circular supporting chains 12 which lie adjacent the sides of the tire and act to hold the cross chains in position. Between the point of connection of the side chains 12 with the supporting chains 13 and the tread of the tire, said cross chains carry the blocks 14 and to this end each block has a substantially U shaped link 16 passing therethrough with each link formed to provide a central eye 17, the free ends of each link connecting with the proceed hooks 15 and the ends of the cross chains 13 secured to the inner projecting parts of the link 16. Each block 14 may be made in any suitable manner and the link 16 for each block is secured thereto by suitable rivets or studs 19 which may be in the nature of calks having pointed projecting heads with the studs passing into the block and having one stud passing through the eye 17 thus securely positioning each link 16 relative to the block with which it is associated.

It will be seen by reference to Fig. 2 that the blocks 14 ordinarily lie to one side of the tread of the tire and that the cross chains function in the usual manner. When the vehicle skids however, the sideward movement because of the contact of a pair of the cross chains with the ground or surface, will exert a pull upon the cross chains which pull or strain is longitudinal of the cross chains and at right angles to the plane of the vehicle wheel and tire, so that one of the blocks will tend to pull down toward the tread of the tire and thus will engage with the surface of the highway causing the pointed projecting heads of the studs or calks to grip the highway and arrest the skid. Upon the skid being interrupted, the vehicle and tire will return to normal position, particularly when applied to an inflated tire when the blocks will project on each side of the tread surface.

By providing the chains in pairs, the blocks will be more readily secured in position in operation and the weight of the vehicle will be better distributed over a larger area of the tire, the chains furthermore providing a better grip of the vehicle on the road.

It will be understood that the blocks can be made in any desired manner and that they not only act to prevent skidding but also perform the function of constituting connecting links between the end portions of the chains and the circular chains extending around the sides of the tire.

Having described my invention, I claim—

1. In an anti-skidding device the combination with spaced pairs of cross chains and circular supporting chains, of links connecting the ends of the cross chains with the supporting chains and studded blocks having said links passing therethrough and secured to the blocks to dispose the blocks adjacent the ends of the cross chains and between the cross chains and the supporting chains.

2. In an anti-skidding device the combination with cross chains and supporting chains, of studded blocks interposed between the ends of the cross chains and the supporting chains and links passing through and secured in said blocks and having ends thereof connected to the ends of the cross chains and to the supporting chains.

In testimony whereof I affix my signature.

WILLIAM P. BELL.